(12) United States Patent  
Juan et al.

(10) Patent No.: US 11,551,358 B2  
(45) Date of Patent: Jan. 10, 2023

(54) METHOD FOR ANALYZING BIOLOGICAL-TISSUE IMAGE AND SYSTEM FOR ANALYZING BIOLOGICAL-TISSUE IMAGE

(71) Applicant: China Medical University, Taichung (TW)

(72) Inventors: Wen-Tau Juan, Taichung (TW); Hao Wu, Taipei (TW); Yu-Kun Chiu, Taipei (TW); Jih-Chiang Tsai, Taipei (TW)

(73) Assignee: China Medical University, Taichung (TW)

( * ) Notice: Subject to any disclaimer, the term of this patent is extended or adjusted under 35 U.S.C. 154(b) by 274 days.

(21) Appl. No.: 17/105,718

(22) Filed: Nov. 27, 2020

(65) Prior Publication Data

US 2022/0148160 A1     May 12, 2022

(30) Foreign Application Priority Data

Nov. 10, 2020 (TW) ................................ 109139224

(51) Int. Cl.
   *G06T 7/00*         (2017.01)
   *G06T 7/12*         (2017.01)
   (Continued)

(52) U.S. Cl.
   CPC .............. *G06T 7/0012* (2013.01); *G06T 5/40* (2013.01); *G06T 7/11* (2017.01); *G06T 7/12* (2017.01);
   (Continued)

(58) Field of Classification Search
   CPC .... G06T 2207/30024; G06T 7/12; G06T 7/11
   See application file for complete search history.

(56) References Cited

U.S. PATENT DOCUMENTS

2011/0040169 A1*   2/2011   Kamen .................... G06T 7/32
                                                    600/411
2015/0078640 A1*   3/2015   Guo ........................ G06T 7/12
                                                    382/131

(Continued)

FOREIGN PATENT DOCUMENTS

TW           201941750 A      11/2019

OTHER PUBLICATIONS

Chen, Yuan-Tsung, et al., "Application of Registration and Construction for Biological Slides", Project Report of National Science Council (NSC), Executive Yuan, dated Oct. 6, 2012, pp. 1-12, implemented by Department of Information and Communication, Kun Shan University, Taiwan, R.O.C.

(Continued)

*Primary Examiner* — Gandhi Thirugnanam

(57) ABSTRACT

A method for analyzing biological-tissue image includes following steps. A plurality of biological-tissue images are provided, and each of the biological-tissue images includes a plurality of target object image blocks. An image pre-processing step is performed so as to obtain a plurality of processed biological-tissue images. A fitting step is performed so as to obtain a plurality of object fitting images of the target object image blocks. A sampling step is performed, wherein a target region of each of the processed biological-tissue images is selected, and the target region includes the object fitting images. A calculating and analyzing step is performed so as to obtain an analysis result of a target regional center of the biological-tissue images.

20 Claims, 13 Drawing Sheets
(5 of 13 Drawing Sheet(s) Filed in Color)

(51) Int. Cl.
*G06T 7/11* (2017.01)
*G06T 5/40* (2006.01)
(52) U.S. Cl.
CPC ............... *G06T 2207/10061* (2013.01); *G06T 2207/10081* (2013.01); *G06T 2207/20036* (2013.01); *G06T 2207/30024* (2013.01)

(56) References Cited

U.S. PATENT DOCUMENTS

| | | | | |
|---|---|---|---|---|
| 2015/0287194 | A1* | 10/2015 | Schoenmeyer | G06F 3/04845 382/128 |
| 2017/0370901 | A1* | 12/2017 | Ichitani | G06T 7/11 |
| 2018/0012365 | A1* | 1/2018 | Chefd'hotel | G06T 7/12 |
| 2018/0018765 | A1* | 1/2018 | Kim | G06T 7/13 |
| 2018/0247101 | A1* | 8/2018 | Wimberger-Friedl | G06V 20/20 |
| 2019/0043198 | A1* | 2/2019 | Ward | G06T 7/11 |
| 2020/0058140 | A1 | 2/2020 | Meldrum et al. | |
| 2022/0148160 | A1* | 5/2022 | Juan | G06T 5/007 |
| 2022/0148323 | A1* | 5/2022 | Watanabe | G06T 11/00 |

OTHER PUBLICATIONS

Ji, Honglei, et al., "Automatic diagnosis of pectus carinatum for children based on the improved Haller index", Journal of Biomedical Engineering, published on Jun. 22, 2018, vol. 35, issue 4, pp. 571-576, published by West China Medical Publishers, China, P.R.C.

Chang, Wei-Ling, et al., "The Making of a Flight Feather: Bio-architectural Principles and Adaptation", CellPress, Nov. 27, 2019, 33 pages.

* cited by examiner

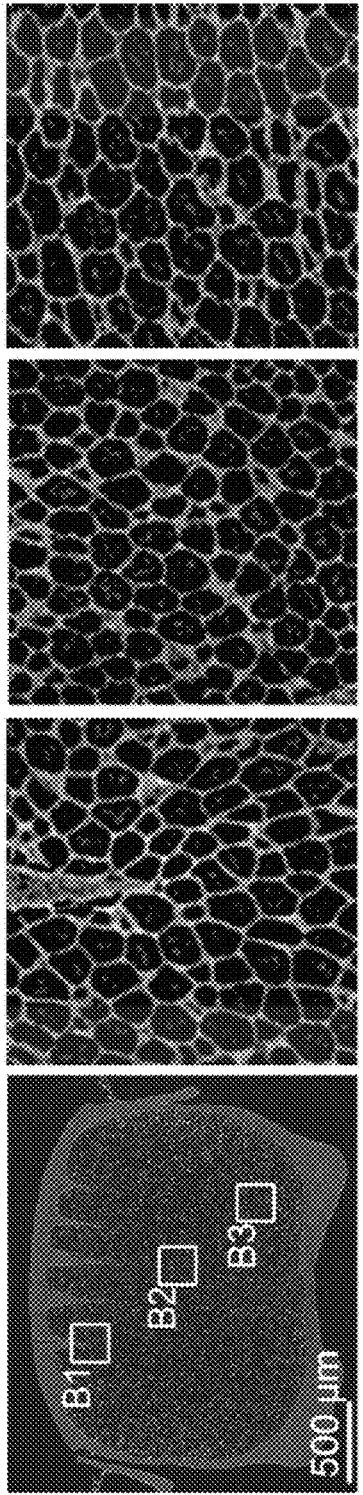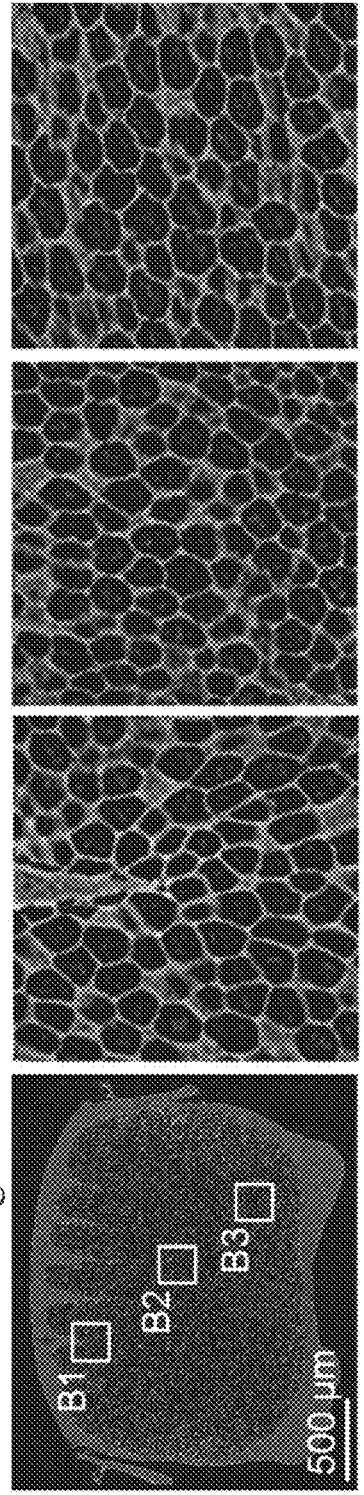
Fig. 9

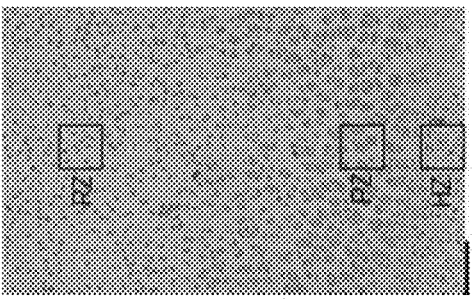
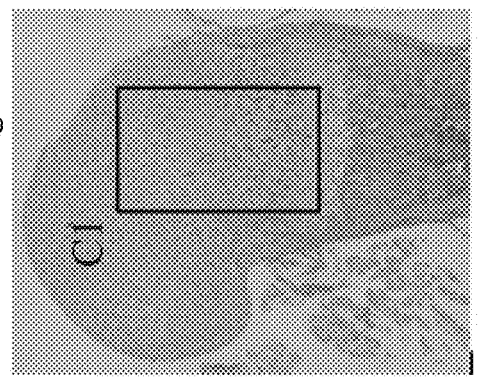
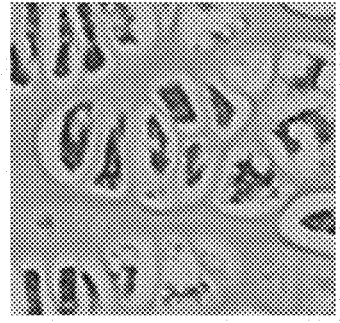
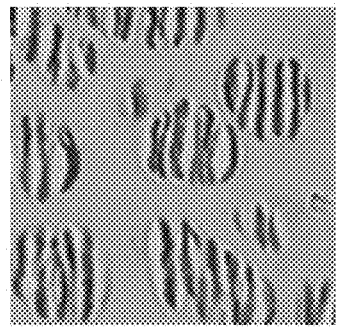
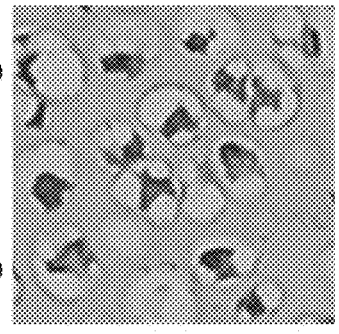
Fig. 11

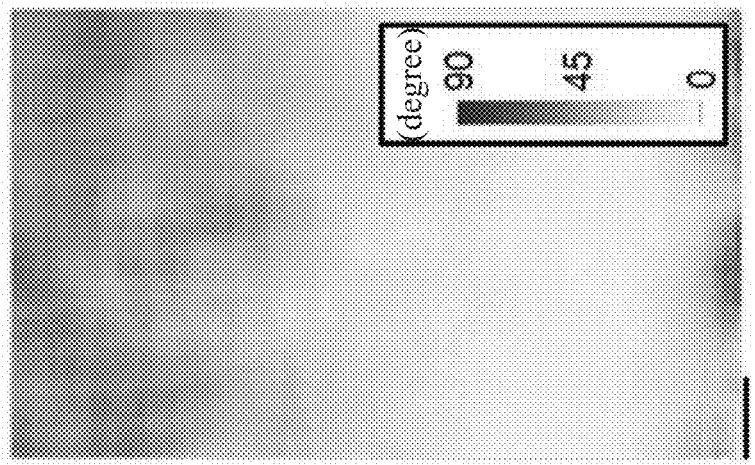
Distribution of regional averaged pointing angle of objects
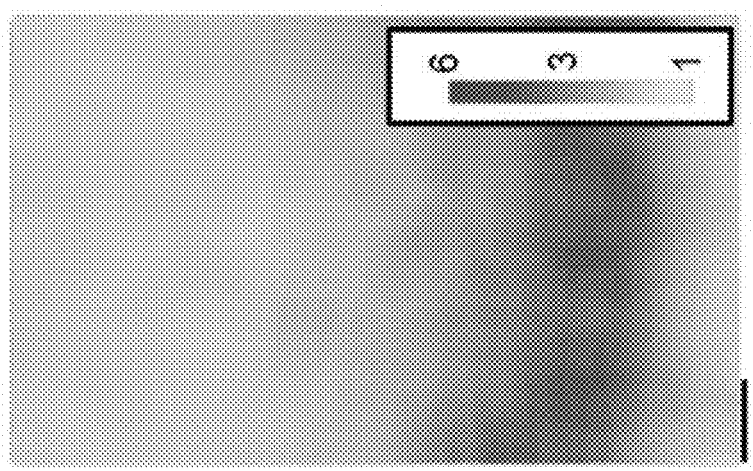
Distribution of regional averaged elongation rate
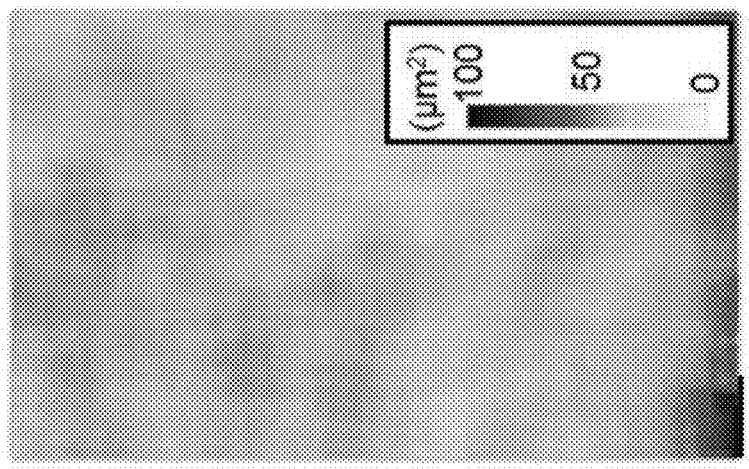
Distribution of regional averaged object size
Fig. 12

METHOD FOR ANALYZING BIOLOGICAL-TISSUE IMAGE AND SYSTEM FOR ANALYZING BIOLOGICAL-TISSUE IMAGE

RELATED APPLICATIONS

This application claims priority to Taiwan Application Serial Number 109139224, filed Nov. 10, 2020, which is herein incorporated by reference.

BACKGROUND

Technical Field

The present disclosure relates to an image analysis system and method. More particularly, the present disclosure relates to a method for analyzing biological-tissue image and a system for analyzing biological-tissue image.

Description of Related Art

A biopsy examination is a method for processing biological tissues taken from plants, animals or humans into thin section slices and then observing the morphology thereof under a microscope and is widely applied in biology, medicine (such as pathology, infectious disease), plant pathology and other related fields.

In the current application, the identification and assessment of tissue slices should be performed by professionals in the field to observe the magnified images under the microscope and then further compare and assess. Ordinary persons who are not in this field cannot directly obtain the relevant results of tissue morphology only by observing the tissue slices. Furthermore, assessed results of the same tissue section slice are often different due to the subjective interpretation habits of different readers, so that the assessment accuracy of the biopsy may differ from that of the actual situation. Moreover, the current assessment of tissue slices only qualitatively describes the morphology of tissue sections and directly derives corresponding interpretation results without precise quantifying the morphology thereof. The qualitative description of the tissue morphology limits the objective tissue slide assessment and hinders the advances of the related technologies.

Therefore, how to develop a quantitative analysis system and an analysis method of the micro-images of tissue slices that are rapid and with high assessing accuracy is a technical subject with clinical application value.

SUMMARY

According to one aspect of the present disclosure, a method for analyzing biological tissue image includes following steps. A plurality of biological-tissue images are provided, wherein the biological-tissue images are respectively corresponding to a set of micro-images of a plurality of sections of a target tissue sample within a finite depth region in the target tissue sample, and each of the biological-tissue images includes a plurality of target object image blocks. An image pre-processing step is performed, wherein an image feature of each of the biological-tissue images is adjusted so as to obtain a plurality of processed biological-tissue images. A fitting step is performed, wherein a contour of each of the target object image blocks within each of the processed biological-tissue images is identified by an edge-finding method so as to obtain a plurality of object fitting images of the target object image blocks by fitting randomly sampled edge pixels of each of the target object image blocks into a geometric shape. A number of the sampled edge pixels for fitting the geometric shape is at least 3. Each of the object fitting images includes a length vector parameter, a width vector parameter, and a pointing angle parameter. A sampling step is performed, wherein the length vector parameter, the width vector parameter, and the pointing angle parameter of each of the object fitting images within a target region of each of the processed biological-tissue images are extracted. Each of the target regions includes the object fitting images. While the sampling step includes the processed biological-tissue images, a shape and a size of the target region of one of the processed biological-tissue images are identical to those of another one of the processed biological-tissue images, and a horizontal coordinate position of the target region of one of the processed biological-tissue images is coincided to that of another one of the processed biological-tissue images. A calculating and analyzing step is performed, wherein the processed biological-tissue images are overlapped so as to coincide the target regions thereof. A regional averaged object size and a regional averaged elongation rate of the object fitting images are respectively calculated based on the length vector parameters and the width vector parameters of the object fitting images within the target regions. A regional averaged pointing angle of objects is calculated based on the pointing angle parameters of the object fitting images within the target regions. An analysis result of a target regional center of the biological-tissue images is output based on the regional averaged object size, the regional averaged elongation rate or the regional averaged pointing angle of objects in the calculating and analyzing step.

According to another aspect of the present disclosure, a system for analyzing biological-tissue image includes an image capturing device and a processor. The image capturing device is for capturing a plurality of biological-tissue images, wherein the biological-tissue images are respectively corresponding to a set of micro-images of a plurality of sections of a target tissue sample within a finite depth region in the target tissue sample, and each of the biological-tissue images includes a plurality of target object image blocks. The processor is electronically connected to the image capturing device, wherein the processor includes a biological-tissue image assessing program. The biological-tissue image assessing program includes an image pre-processing module, a fitting module, a sampling module and a calculating and analyzing module. The image pre-processing module is for adjusting an image feature of each of the biological-tissue images so as to obtain a plurality of processed biological-tissue images. The fitting module is for identifying a contour of each of the target object image blocks within each of the processed biological-tissue images by an edge-finding method so as to obtain a plurality of object fitting images of the target object image blocks by fitting randomly sampled edge pixels of each of the target object image blocks into a geometric shape, wherein a number of the sampled edge pixels for fitting the geometric shape is at least 3. Each of the object fitting images includes a length vector parameter, a width vector parameter and a pointing angle parameter. The sampling module is for extracting the length vector parameter, the width vector parameter, and the pointing angle parameter of each of the object fitting images within a target region of each of the processed biological-tissue images, and each of the target regions includes the object fitting images. While the sampling module includes the processed biological-tissue images, a shape and a size of the target region of one of the processed biological-tissue images are identical to those of another one of the processed biological-tissue images, and a horizontal coordinate position of the target region of one of the processed biological-tissue images is coincided to that of another one of the processed biological-tissue images. The calculating and analyzing module is for calculating and analyzing a quantitative morphological feature obtained from the biological tissue images. By overlapping the processed biological-tissue images so as to coincide the target regions thereof, a regional averaged object size and a regional averaged elongation rate of the object fitting images are respectively calculated based on the length vector parameters and the width vector parameters of the object fitting images within the target regions. A regional averaged pointing angle of objects is calculated based on the pointing angle parameters of the object fitting images within the target regions. An analysis result of a target regional center of the biological-tissue images is output based on the regional averaged object size, the regional averaged elongation rate or the regional averaged pointing angle of objects by the calculating and analyzing module.

BRIEF DESCRIPTION OF THE DRAWINGS

The patent or application file contains at least one drawing executed in color. Copies of this patent or patent application publication with color drawing(s) will be provided by Office upon request and payment of the necessary fee. The present disclosure can be more fully understood by reading the following detailed description of the embodiment, with reference made to the accompanying drawings as follows:

FIG. 9 shows computed tomography images of a feather rachis tissue of chicken primary feather analyzed in the method for analyzing biological-tissue image of the present disclosure.

FIG. 11 shows optical microscope images of articular cartilage tissue of mouse knee joint analyzed in the method for analyzing biological-tissue image of the present disclosure.

FIG. 12 shows results of quantified cellular morphology distributions of the articular cartilage tissue of the mouse knee joint of FIG. 11.

DETAILED DESCRIPTION

The present disclosure will be further exemplified by the following specific embodiments. However, these practical details are used to describe how to implement the materials and methods of the present disclosure and are not necessary.

[Method for Analyzing Biological-Tissue Image of the Present Disclosure]

Figure 1:
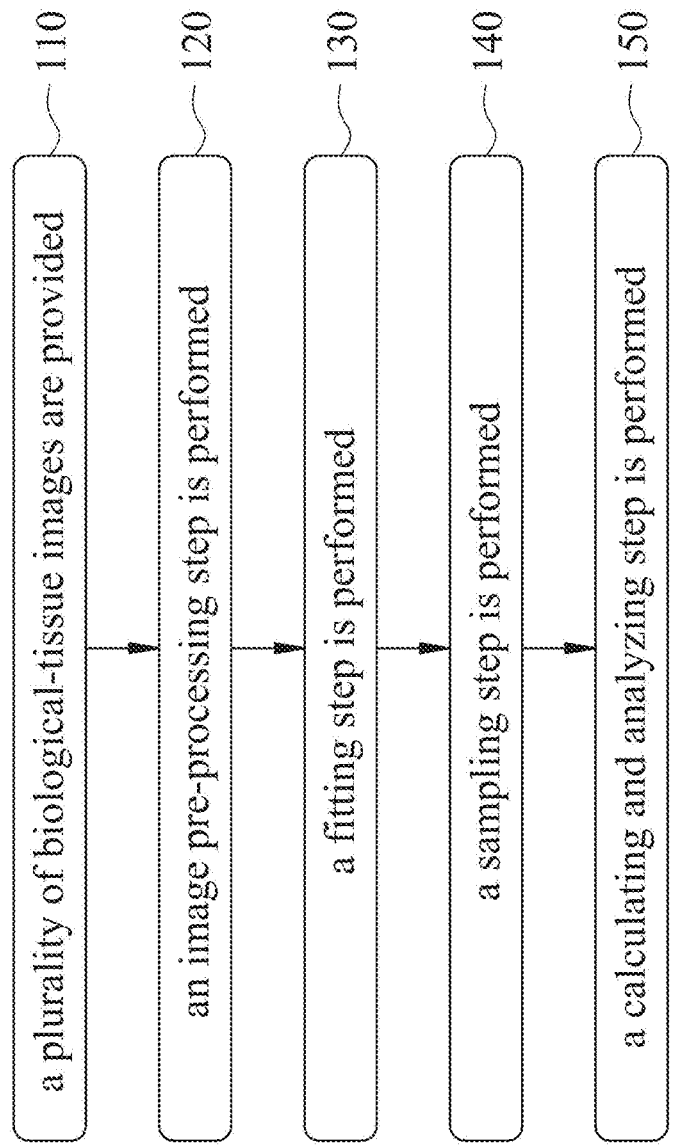
FIG. 1 is a flow chart of a method for analyzing biological-tissue image according to the 1st embodiment of the present disclosure.

Please refer to FIG. 1, which is a flow chart of a method 100 for analyzing biological-tissue image according to the 1st embodiment of the present disclosure. The method 100 for analyzing biological-tissue image includes Step 110, Step 120, Step 130, Step 140 and Step 150.

In Step 110, a plurality of biological-tissue images are provided, wherein the biological-tissue images are respectively corresponding to a set of micro-images of a plurality of sections of a target tissue sample within a finite depth region in the target tissue sample, and each of the biological-tissue images includes a plurality of target object image blocks. In detail, the biological-tissue images of the present disclosure are images of the sections of the target tissue sample within the finite depth region in the target tissue sample. An image of each of the cell or the specific tissue micro-structure (such as cell membrane, organelles or other substances that can be identified with clear images) distributed in the biological-tissue images is a target object image block. Furthermore, each of the biological-tissue images can be a computed tomography image (CT image), an optical microscope image, an electron microscope image, or other biomedical images which can resolve the inner microstructures of the target tissue sample. The aforementioned images can be plane images or three-dimensional images, but the present disclosure is not limited thereto. Moreover, a thickness of each of the sections of the target tissue sample is 0.5 to 10 µm, and a number of the biological-tissue images is at least 5 so as to increase the analysis accuracy. In specific, when the number of the biological-tissue images is larger than 5, the biological-tissue images can be analyzed by the method 100 for analyzing biological-tissue image, and when the number of the biological-tissue images increases, the quality of the quantitative analysis thereof is improved. Thus, the number of the biological-tissue images is at least 5 so as to process the following analysis.

In Step 120, an image pre-processing step is performed, wherein an image feature of each of the biological-tissue images is adjusted so as to obtain a plurality of processed biological-tissue images. More preferably, the aforementioned image feature of each of the biological-tissue images includes a contrast value and a grayscale value, wherein the contrast value of each of the biological-tissue images is adjusted according to a contrast limited adaptive histogram equalization (CLAHE) enhancement method in the image pre-processing step, and the grayscale value of each of the biological-tissue images is adjusted according to a binarization processing method. In detail, the CLAHE enhancement method can prevent the noise problem caused by over-enhancing of signals in the same region in the image of the ordinary histogram equalization algorithm, and the binarization processing method can adjust the grayscale value of the biological-tissue images ranging from 0 to 255 to binary digit so as to reduce amount the information thereof. Thus, the contour of the biological-tissue images can be emphasized so as to clearly define the target object image blocks of the present disclosure and then process the following analysis.

In Step 130, a fitting step is performed, wherein a contour of each of the target object image blocks within each of the processed biological-tissue images is identified by an edge-finding method so as to obtain a plurality of object fitting images of the target object image blocks by fitting randomly sampled edge pixels of each of the target object image blocks into a geometric shape. A number of the sampled edge pixels for fitting the geometric shape is at least 3. Parameters to describe each of the object fitting images include a length vector parameter, a width vector parameter, and a pointing angle parameter. In detail, in order to extract the information of size, elongation rate, and pointing angle of the target object image blocks, the method 100 for analyzing biological-tissue image of the present disclosure uses at least 3 of sampled edge pixels for fitting the geometric shape to fit the contour of each of the target object image blocks so as to parameterize the target object image blocks and then obtain a plurality of object fitting images. In specific, if a number of the sampled edge pixels is smaller, the fitting accuracy will be reduced, but the calculating speed thereof will be more rapid. By contrast, if the number of the sampled edge pixels increases, the fitting accuracy will be increased, but the calculating speed thereof will slow down. Furthermore, the number of the sampled edge pixels for fitting the geometric shape is 5 to 50 so as to obtain the best balance between the calculating accuracy of the object fitting images and the calculating efficiency thereof. Furthermore, a geometric shape of each of the object fitting images is an ellipse shape, a value of the length vector parameter is two times of a length of a semi-major axis of the ellipse shape, and a value of the width vector parameter is two times of a length of a semi-minor axis of the ellipse shape. Moreover, if the biological-tissue images of the present disclosure are three-dimensional images, a shape of each of the object fitting images is an ellipsoid, the length vector parameter and the width vector parameters thereof are the principle axes with different lengths in the ellipsoid according to actual needs, and the present disclosure is not limited thereof.

Furthermore, it must be noted that the method 100 for analyzing biological-tissue image of the present disclosure not only can be used to analyze the biological-tissue images including living cells but also be used to quantify the specific tissue micro-structures and the corresponding spatial distributions when the target tissue sample is formed by dead cells or accumulated inter/intra-cellular substance. Thus, the application range of the method 100 for analyzing biological-tissue image can be wider and has application potentials in the related market. In addition, it must be noted that the method 100 for analyzing biological-tissue image also can be used to analyze the biomedical materials or other artificial porous materials so as to quantify the internal micro-structures of the aforementioned materials, but the present disclosure is not limited thereto.

In Step 140, a sampling step is performed, wherein the length vector parameter, the width vector parameter, and the pointing angle parameter of the object fitting images of each of the object fitting images within a target region of each of the processed biological-tissue images are extracted. Each target region includes multiple object fitting images. While the sampling step includes the processed biological-tissue images, a shape and a size of the target region of one of the processed biological-tissue images are identical to those of another one of the processed biological-tissue images, and a horizontal coordinate position of the target region of one of the processed biological-tissue images is coincided to that of another one of the processed biological-tissue images.

In detail, a shape of each of the target regions is a square shape, and a length of one side of the square shape is equal to 2 to 10 times of an averaged length of the semi-major axis of the object fitting images. By the method that the target region includes a plurality of object fitting images, it is favorable for increasing the accuracy of the method 100 by increasing the number of object fitting images for analyzing biological-tissue image and facilitating the following analysis. Furthermore, the target region of each of the biological-tissue images includes at least 5 of the object fitting images. The 5 object fitting images contribute a reasonably accurate analysis, and the length of one side of the square shape is equal to 6 times of the averaged length of the semi-major axis of the object fitting images.

In Step 150, a calculating and analyzing step is performed, wherein the processed biological-tissue images are overlapped so as to coincide the target regions thereof. A regional averaged object size and a regional averaged elongation rate of the object fitting images are respectively calculated based on the length vector parameters and the width vector parameters of the object fitting images within the target regions. A regional averaged pointing angle of objects is calculated based on the pointing angle parameters of the object fitting images within the target regions. An analysis result of a target regional center of the biological-tissue images is output based on the regional averaged object size, the regional averaged elongation rate, or the regional averaged pointing angle of objects in the calculating and analyzing step. Furthermore, the calculating and analyzing step also can calculate a regional eccentricity or a regional porosity of the coincided target regions of the object fitting images based on the length vector parameter and the width vector parameter thereof, and the present disclosure is not limited thereto.

In each of the object fitting images, the length of a semi-major axis is a, the length of a semi-minor axis is b, a size of the object fitting image is $\pi ab$, and an elongation rate of the object fitting image is b/a, wherein $\pi$ is a circular constant. In the object fitting images within the target region of each of the processed biological-tissue images, when the regional averaged object size is PS, and the regional averaged elongation rate is PEL, the following conditions are satisfied: $PS = \Sigma(\pi ab)/n$; and $PEL = \Sigma(b/a)/n$, wherein n is a number of the object fitting images within the target region. Furthermore, the regional averaged object size is an average of the sizes of all the objects in the target region, the regional averaged elongation rate is an average of the elongation rate of all the objects in the target region, and the aforementioned regional averaged object size is calculated based on the object sizes of the object fitting images. Furthermore, by displaying the regional averaged object size, the regional averaged elongation rate, or the regional averaged pointing angle of objects in object fitting images over different target regions in biological-tissue images, the spatial distributions of the size, the shape, and the pointing angle of objects, cells, or specific tissue micro-structures are respectively presented. Thus, the morphological information which is implicit in the biological-tissue image can be quantified spatially, so that it is favorable for intuitively and precisely analyzing the spatial distribution of morphological characteristics in the target tissue sample, and it has application potentials in relevant fields.

Figure 2:
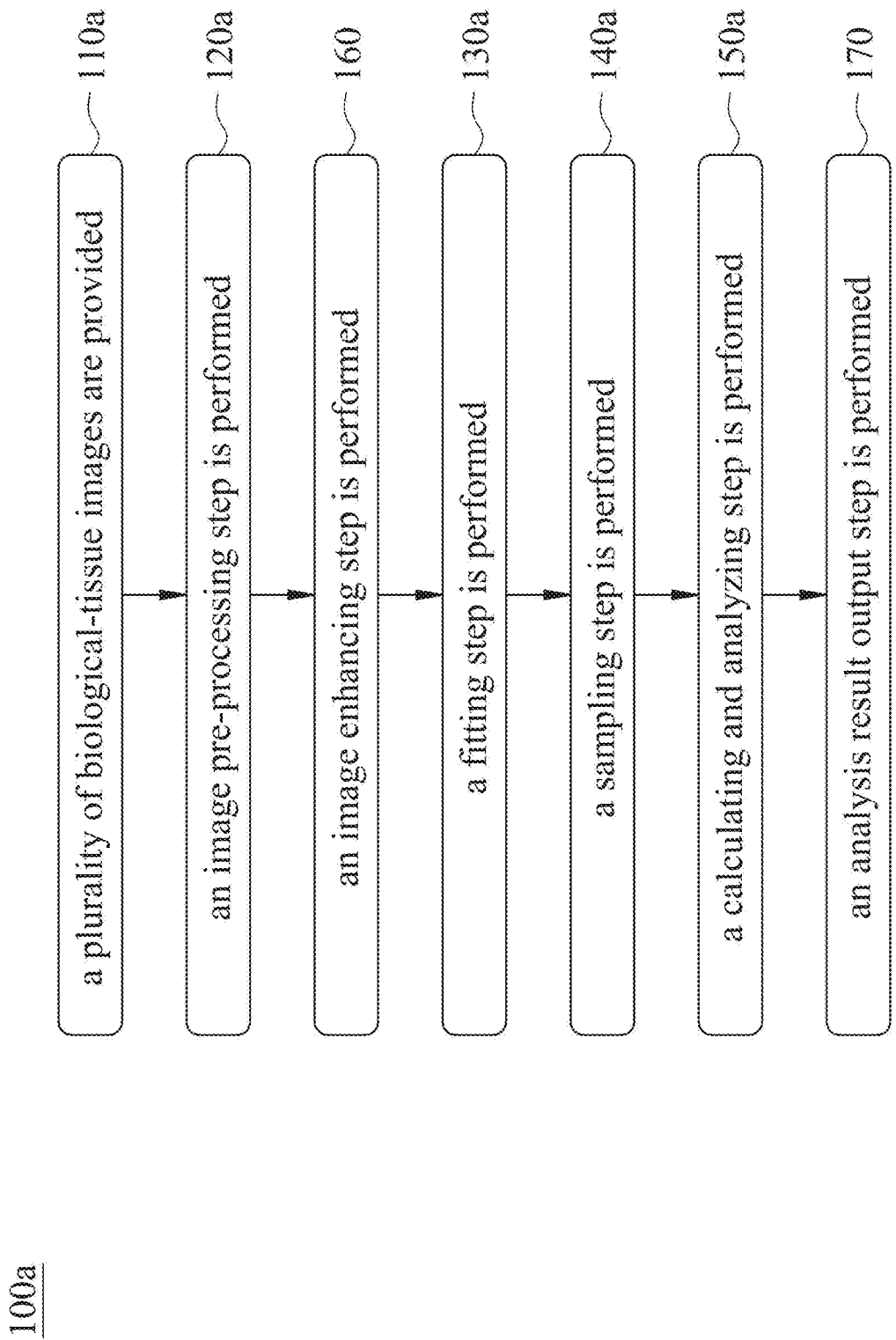
FIG. 2 is a flow chart of a method for analyzing biological-tissue image according to the 2nd embodiment of the present disclosure.

Please refer to FIG. 2, which is a flow chart of a method 100a for analyzing biological-tissue image according to the 2nd embodiment of the present disclosure. The method 100a for analyzing biological-tissue image includes Step 110a, Step 120a, Step 130a, Step 140a, Step 150a, Step 160 and Step 170, wherein Step 110a, Step 120a, Step 130a, Step 140a and Step 150a are the same with Step 110, Step 120, Step 130, Step 140 and Step 150 of FIG. 1, so that the details thereof are not be described again.

In Step 160, an image enhancing step is performed, wherein each of the biological-tissue images is processed by a noise removing method and a morphological closing method so as to obtain a plurality of enhanced images for object fitting, and the enhanced images for object fitting are processed in the fitting step so as to obtain the object fitting images. In detail, in the image enhancing step, the non-target objects and the background noise of the biological-tissue images are removed, and then the contour of the target object image blocks are closed by the morphological closing method so as to obtain the enhanced images for object fitting in patch-shaped in the following fitting step. Thus, it is favorable for enhancing the contrast of the image and increasing the accuracy of the following fitting step.

In Step 170, an analysis result output step is performed, wherein the analysis result of the target regional center of the biological-tissue images of the coincided target regions thereof is output by a coarse-graining method based on the regional averaged object size, the regional averaged elongation rate, or the regional averaged pointing angle of objects in the object fitting images.

Hence, it is favorable for comparing the quantified morphology distribution result of the objects obtained by the overlapped information with the spatial distribution of the object morphology of the target tissue sample within a finite depth region in the target tissue sample. Thus, the morphological information which is implicit in the biological-tissue image can be quantified spatially by the method 100a for analyzing biological-tissue image of the present disclosure. Therefore, it is favorable for intuitively and precisely analyzing the spatial distribution of morphological characteristics in the target tissue sample.

Therefore, by analyzing the length vector parameter, the width vector parameter, and the pointing angle parameter of object fitting images of the specific target region of each of the biological-tissue images, and then calculating the regional averaged object size, the regional averaged elongation rate, or the regional averaged pointing angle of objects of the three-dimensional space formed by the accumulation of the target regions of the processed biological-tissue images, the present disclosure can output an analysis result of the target regional center of the biological-tissue images weighted by sampling region. Thus, the morphological information which is implicit in the biological-tissue image can be quantified, and the results thereof can correspond to the quantified morphology distribution result of the objects of the target tissue sample within a finite depth region in the target tissue sample, so that it is favorable for intuitively and precisely analyzing the spatial distribution of morphological characteristics in the target tissue sample in microcosmic, and has application potentials in relevant fields.

[System for Analyzing Biological-Tissue Image of the Present Disclosure]

Figure 3:
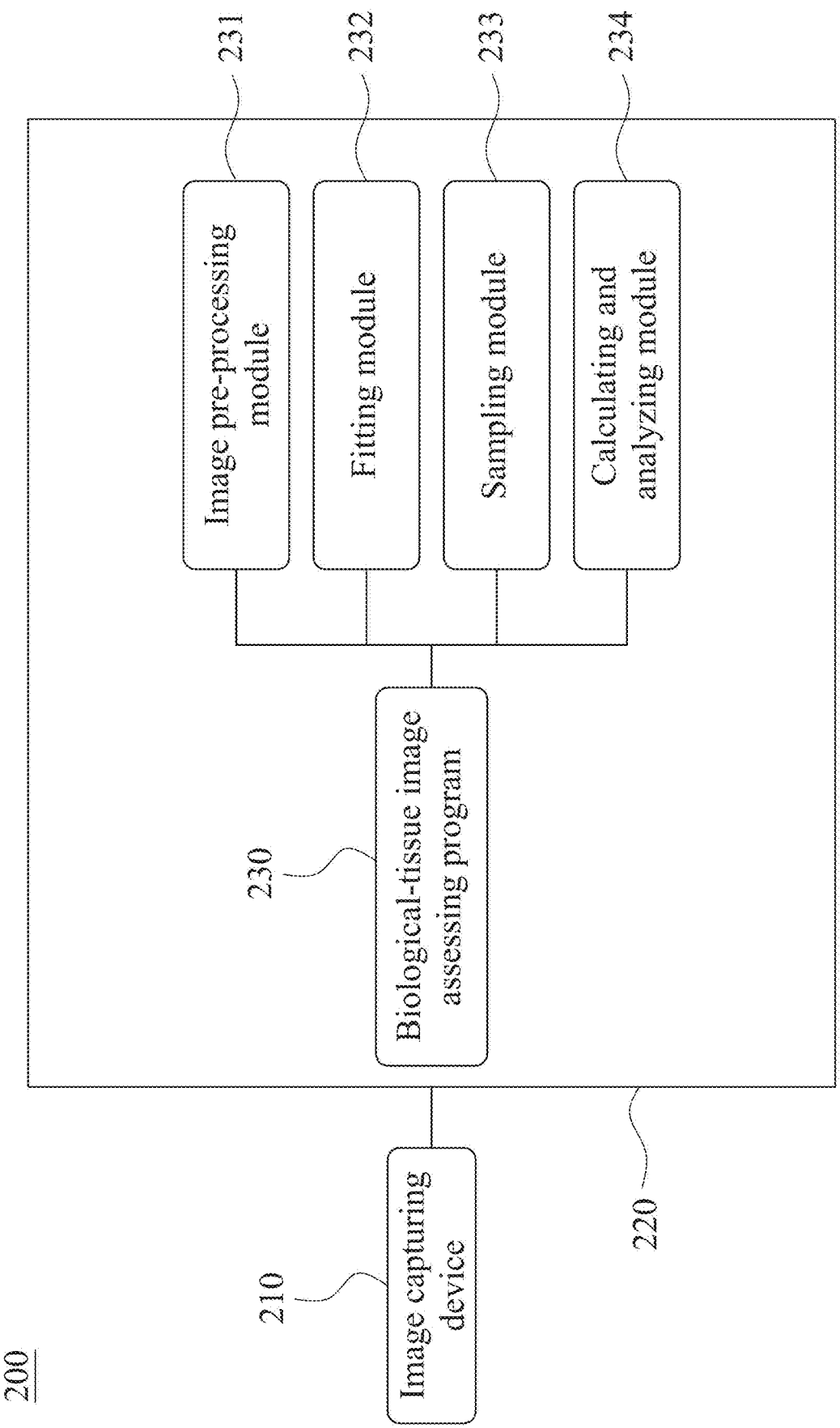
FIG. 3 is a block diagram of a system for analyzing biological-tissue image according to the 3rd embodiment of the present disclosure.

Please refer to FIG. 3, which is a block diagram of a system 200 for analyzing biological-tissue image according to the 3rd embodiment of the present disclosure. The system 200 for analyzing biological-tissue image includes an image capturing device 210 and a processor 220.

The image capturing device 210 is for capturing a plurality of biological-tissue images, wherein the biological-tissue images are respectively corresponding to a set of micro-images of a plurality of sections of a target tissue sample within a finite depth region in the target tissue sample, and each of the biological-tissue images includes a plurality of target object image blocks. In detail, the biological-tissue images of the present disclosure are images of the sections of the target tissue sample within the finite depth region in the target tissue sample, and an image of each of the cell or the specific tissue micro-structure distributed in the biological-tissue images is a target object image block. Furthermore, each of the biological-tissue images can be a CT image, an optical microscope image, an electron microscope image, or other biomedical images which can resolve the inner micro-structures of the target tissue sample, and the aforementioned images can be plane images or three-dimensional images, but the present disclosure is not limited thereto.

Furthermore, a thickness of each of the sections of the target tissue sample is 0.5 to 10 μm, and a number of the biological-tissue images is at least 5 so as to increase the analysis accuracy. In specific, when the number of the biological-tissue images is larger than 5, the biological-tissue images can be analyzed by the method 100 for analyzing biological-tissue image, and when the number of the biological-tissue images increases, the quality of the quantitative analysis thereof is improved. Thus, the number of the biological-tissue images is at least 5 so as to process the following analysis.

The processor 220 is electronically connected to the image capturing device 210, wherein the processor 220 includes a biological-tissue image assessing program 230, and the biological-tissue image assessing program 230 includes an image pre-processing module 231, a fitting module 232, a sampling module 233, and a calculating and analyzing module 234.

The image pre-processing module 231 is for adjusting an image feature of each of the biological-tissue images so as to obtain a plurality of processed biological-tissue images. In specific, the aforementioned image feature of each of the biological-tissue images includes a contrast value and a grayscale value, wherein the contrast value of each of the biological-tissue images is adjusted according to a contrast limited adaptive histogram equalization (CLAHE) enhancement method by the image pre-processing module 231 and the grayscale value of each of the biological-tissue images is adjusted according to a binarization processing method by the image pre-processing module 231. Accordingly, the noise problem caused by over-enhancing of signals in the same region in the image of the ordinary histogram equalization algorithm can be prevented, and the binarization processing method can adjust the grayscale value of the biological-tissue images so as to reduce amount the information thereof. Thus, the target object image blocks of the present disclosure can be clearly defined so as to facilitate the following analysis.

The fitting module 232 is for identifying a contour of each of the target object image blocks within each of the processed biological-tissue images by an edge-finding method so as to obtain a plurality of object fitting images of the target object image blocks by fitting randomly sampled edge pixels of each of the target object image blocks into a geometric shape, wherein a number of sampled edge pixels for fitting the geometric shape of the edge-finding method is at least 3. Parameters to describe each of the object fitting images include a length vector parameter, a width vector parameter, and a pointing angle parameter. In detail, in order to extract the information of size, elongation rate, and pointing angle of the target object image blocks, the fitting module 232 uses at least 3 sampled edge pixels to fit the contour of each of the target object image blocks so as to parameterize the target object image blocks and then obtain a plurality of object fitting images. In specific, if a number of the sampled edge pixels is smaller, the fitting accuracy will be reduced, but the calculating speed thereof will be more rapid. By contrast, if the number of the sampled edge pixels is larger, the fitting accuracy will be increased, but the calculating speed thereof will slow down. Furthermore, the number of the sampled edge pixels for fitting the geometric shape is 5 to 50 so as to obtain the best balance between the calculating accuracy of the object fitting images and the calculating efficiency thereof. Furthermore, a shape of each of the object fitting images is an ellipse shape, a value of the length vector parameter is two times of a length of a semi-major axis of the ellipse shape, and a value of the width vector parameter is two times of a length of a semi-minor axis of the ellipse shape. Moreover, if the biological-tissue images of the present disclosure are three-dimensional images, a shape of each of the object fitting images is an ellipsoid, the length vector parameter and the width vector parameters thereof are the principle axes with different lengths in the ellipsoid according to actual needs, and the present disclosure is not limited thereof.

The sampling module 233 is for extracting the length vector parameter, the width vector parameter, and the pointing angle parameter of the object fitting images of each of the object fitting images within a target region of each of the processed biological-tissue images, wherein the target region includes the object fitting images. While the sampling module 233 includes the processed biological-tissue images, a shape and a size of the target region of one of the processed biological-tissue images are identical to those of another one of the processed biological-tissue images, and a horizontal coordinate position of the target region of one of the processed biological-tissue images is coincided to that of another one of the processed biological-tissue images. In detail, a shape of each of the target regions is a square shape, and a length of one side of the square shape is equal to 2 to 10 times of an averaged length of the semi-major axis of the object fitting images. By the method that the target region includes a plurality of object fitting images, it is favorable for increasing the accuracy of the following analysis by increasing the number of object fitting images. Furthermore, the target region of each of the biological-tissue images includes at least 5 of the object fitting images, the 5 object fitting images contribute a reasonable accurate analysis, and the length of one side of the square shape is equal to 6 times of the averaged length of the semi-major axis of the object fitting images.

The calculating and analyzing module 234 is for calculating and analyzing a quantitative morphological feature obtained from the biological tissue images. The quantitative morphological feature includes a regional averaged object size, a regional averaged elongation rate, or a regional averaged pointing angle of objects. By overlapping the processed biological-tissue images so as to coincide the target regions thereof, the regional averaged object size, or the regional averaged elongation rate of the object fitting images are respectively calculated based on the length vector parameters and the width vector parameters of the object fitting images within the target regions. The regional averaged pointing angle of objects is calculated based on the pointing angle parameters of the object fitting images within the target regions. An analysis result of a target regional center of the biological-tissue images is output based on the regional averaged object size, the regional averaged elongation rate, or the regional averaged pointing angle of objects by the calculating and analyzing module 234.

In specific, in each of the object fitting images, the length of a semi-major axis is a, the length of a semi-minor axis is b, a size of the object fitting image is $\pi ab$, and an elongation rate of the object fitting image is b/a, wherein $\pi$ is a circular constant. In the object fitting images within the target region of each of the processed biological-tissue images, when the regional averaged object size is PS, and the regional averaged elongation rate is PEL, the following conditions are satisfied: $PS=\Sigma(\pi ab)/n$; and $PEL=\Sigma(b/a)/n$, wherein n is a number of the object fitting images within the target region.

Furthermore, it must be noted that the system 200 for analyzing biological-tissue image of the present disclosure not only can be used to analyze the biological-tissue images including living cells but also be used to quantify the specific tissue micro-structures and the corresponding spatial distributions when the target tissue sample is formed by dead cells or accumulated inter/intra cellular substance. Thus, the application range of the system 200 for analyzing biological-tissue image can be wider and has application potentials in the related market. In addition, it must be noted that the system 200 for analyzing biological-tissue image also can be used to analyze the biomedical materials or other artificial porous materials so as to quantify the internal micro-structures of the aforementioned materials, but the present disclosure is not limited thereto.

Figure 4:
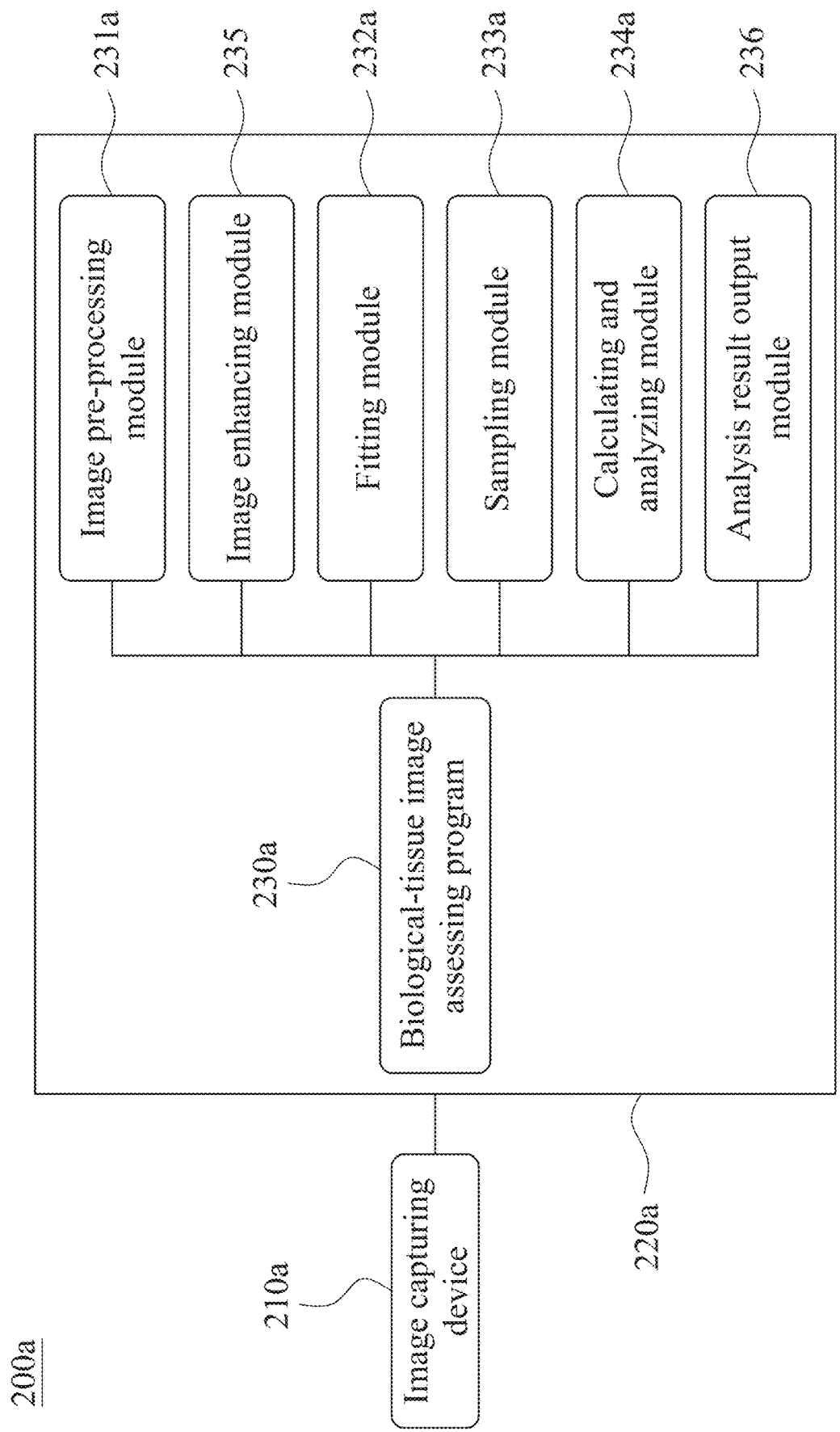
FIG. 4 is a block diagram of a system for analyzing biological-tissue image according to the 4th embodiment of the present disclosure.

Please refer to FIG. 4, which is a block diagram of a system 200a for analyzing biological-tissue image according to the 4th embodiment of the present disclosure. The system 200a for analyzing biological-tissue image includes an image capturing device 210a and a processor 220a, wherein the processor 220a includes a biological-tissue image assessing program 230a, and the biological-tissue image assessing program 230a includes an image pre-processing module 231a, a fitting module 232a, a sampling module 233a, a calculating and analyzing module 234a, an image enhancing module 235 and an analysis result output module 236. The image capturing device 210a and the processor 220a of the system 200a for analyzing biological-tissue image are the same with the image capturing device 210 and the processor 220 of FIG. 3, and the image pre-processing module 231a, the fitting module 232a, the sampling module 233a and the calculating and analyzing module 234a of the biological-tissue image assessing program 230a are the same with the image pre-processing module 231, the fitting module 232, the sampling module 233 and the calculating and analyzing module 234 of the biological-tissue image assessing program 230 of FIG. 3, so that the same details thereof are not be described again.

The image enhancing module 235 is for processing each of the biological-tissue images by a noise removing method and a morphological closing method so as to obtain a plurality of enhanced images for object fitting. In detail, the image enhancing module 235 is for removing the non-target objects and the background noise of the biological-tissue images and then the contours of the target object image blocks are closed by the morphological closing method so as to obtain the enhanced images for object fitting, and the enhanced images for object fitting are processed by the fitting module in patch-shaped in the following fitting module 232a so as to obtain the object fitting images. Thus, it is favorable for enhancing the contrast of the image and increasing the accuracy of the following fitting step.

In the analysis result output module 236, the analysis result of the target regional center of the biological-tissue images is output by a coarse-graining method based on the regional averaged object size, the regional averaged elongation rate, or the regional averaged pointing angle of objects of the object fitting images. Hence, it is favorable for comparing the quantified morphology distribution result of the objects obtained by the overlapped information with the spatial distribution of the object morphology of the target tissue sample within a finite depth region in the target tissue sample, so that the morphological information which is implicit in the biological-tissue image can be quantified. Therefore, it is favorable for intuitively and precisely analyzing the spatial distribution of morphological characteristics in the target tissue sample.

Therefore, by analyzing the length vector parameter, the width vector parameter, and the pointing angle parameter of object fitting images of the specific target region of each of the biological-tissue images, and then calculating the regional averaged object size, the regional averaged elongation rate, or the regional averaged pointing angle of objects of the three-dimensional space formed by the accumulation of the target regions of the processed biological-tissue images, the system 200 for analyzing biological-tissue image and the system 200a for analyzing biological-tissue image of the present disclosure can output an analysis result of a target regional center of the biological-tissue images weighted by sampling region. Thus, the morphological information which is implicit in the biological-tissue image can be quantified by the system 200 for analyzing biological-tissue image and the system 200a for analyzing biological-tissue image, and the results thereof can correspond to the quantified morphology distribution result of the objects of the target tissue sample within a finite depth region in the target tissue sample, so that it is favorable for intuitively and precisely analyzing the spatial distribution of morphological characteristics in the target tissue sample in microcosmic, and has application potentials in relevant fields.

Example

The present disclosure will be further exemplified by the following specific embodiments with figures to facilitate utilizing and practicing the present disclosure completely by the people skilled in the art without over-interpreting and over-experimenting. However, these practical details are used to describe how to implement the materials and methods of the present disclosure and are not necessary.

I. Pre-Processing the Biological-Tissue Images

Figure 5:
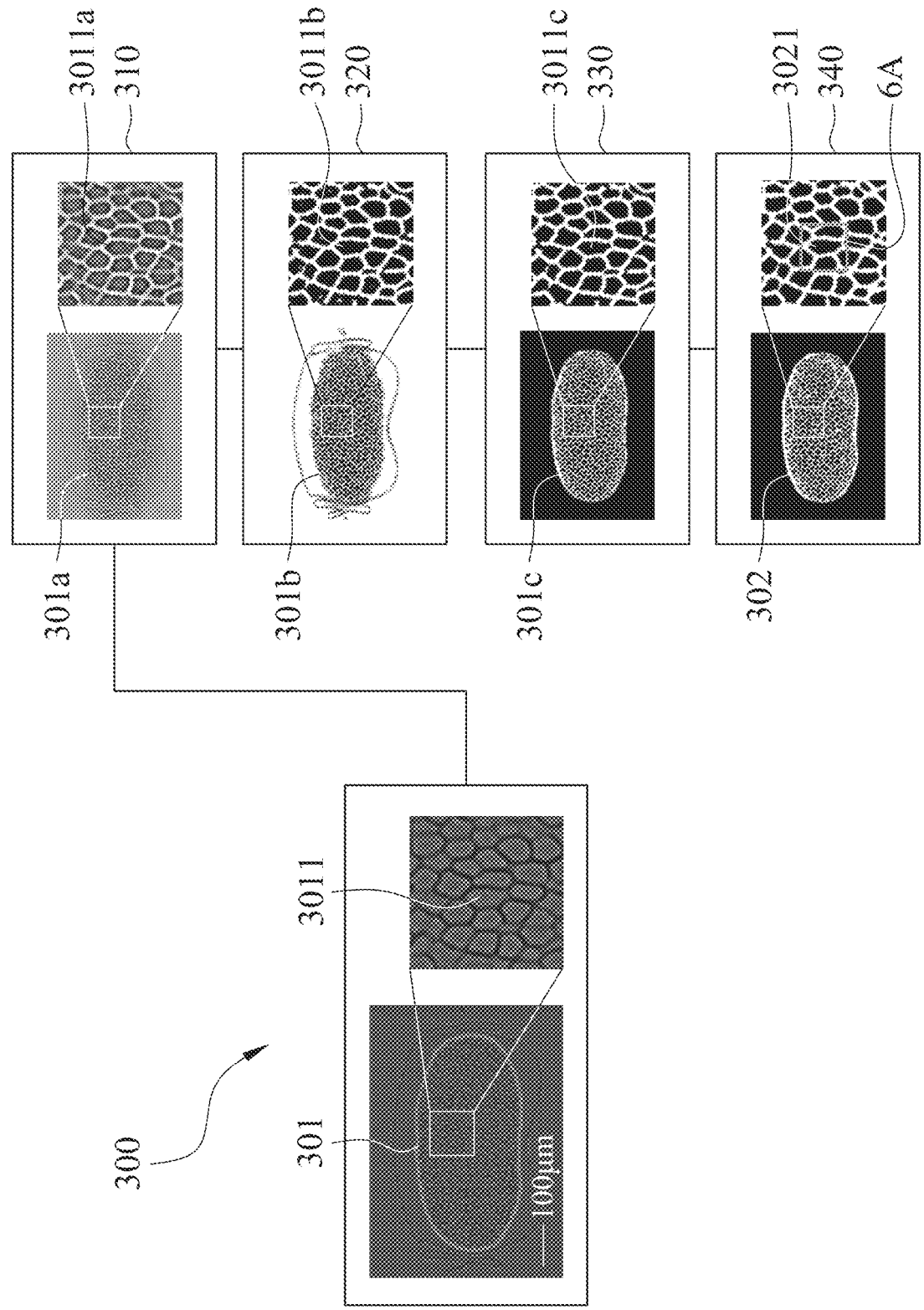
FIG. 5 is a flow chart of an image pre-processing step of a method for analyzing biological-tissue image of the present disclosure.

Please refer to FIG. 5, which is a flow chart of an image pre-processing step 300 of a method for analyzing biological-tissue image of the present disclosure. The details of the method for analyzing biological-tissue image and the system for analyzing biological-tissue image of the present disclosure will be further described by the tissue sections of feather rachis of bird feathers.

1. Capturing the Biological-Tissue Images

First, the target feather rachis tissue of bird will be embedded in paraffin or fixed by frozen section procedure and then sliced into sections so as to obtain a plurality of feather rachis sections within a finite depth region in the target tissue sample of the target feather rachis tissue, and a thickness of each of the feather rachis sections is 0.5 to 10 µm. The aforementioned feather rachis sections within the finite depth region in the target tissue sample will be observed under a microscope with a 10× objective magnification, and then the images thereof will be taken by a digital SLR camera (Canon EOS 550D, Tokyo, Japan) so as to obtain a plurality of biological-tissue images 301, wherein each of the biological-tissue images 301 includes a plurality of target object image blocks 3011 so as to process the following analysis.

2. Image Pre-Processing

As shown in FIG. 5, in the image pre-processing step 300, the biological-tissue images 301 of the target feather rachis tissue will be processed by a contrast value adjusting step 310 by an image pre-processing module. The image pre-processing step 300 adjusts a contrast value of the biological-tissue images 301 according to a contrast limited adaptive histogram equalization enhancement method so as to obtain a first biological-tissue image 301a. In this time, there will be clear separations between different target object image blocks.

Next, the first biological-tissue image 301a will be processed by a grayscale value adjusting step 320 by the image pre-processing module. The grayscale value adjusting step 320 adjusts a grayscale value of the first biological-tissue image 301a according to a binarization processing method so as to obtain a second biological-tissue image 301b. In this time, the contour of the target object image blocks 3011b of the second biological-tissue image 301b will become clearer.

Then, the second biological-tissue image 301b will be processed by a noise removing step 330 by the image pre-processing module to remove the image of a cortex portion of the target feather rachis tissue and the background noise so as to obtain a third biological-tissue image 301c. The third biological-tissue image 301c including target object image blocks 3011c of the medulla portion of the target feather rachis tissue will be used to process the following analysis.

Finally, the third biological-tissue image 301c will be processed by a morphological closing step 340 by the image pre-processing module to adjust and close the contour of the target object image blocks 3011c so as to obtain an enhanced image 302 for object fitting. Accordingly, the contrast value of image can be enhanced so as to increase the accuracy of the following process.

3. Fitting and Sampling

Figure 6:
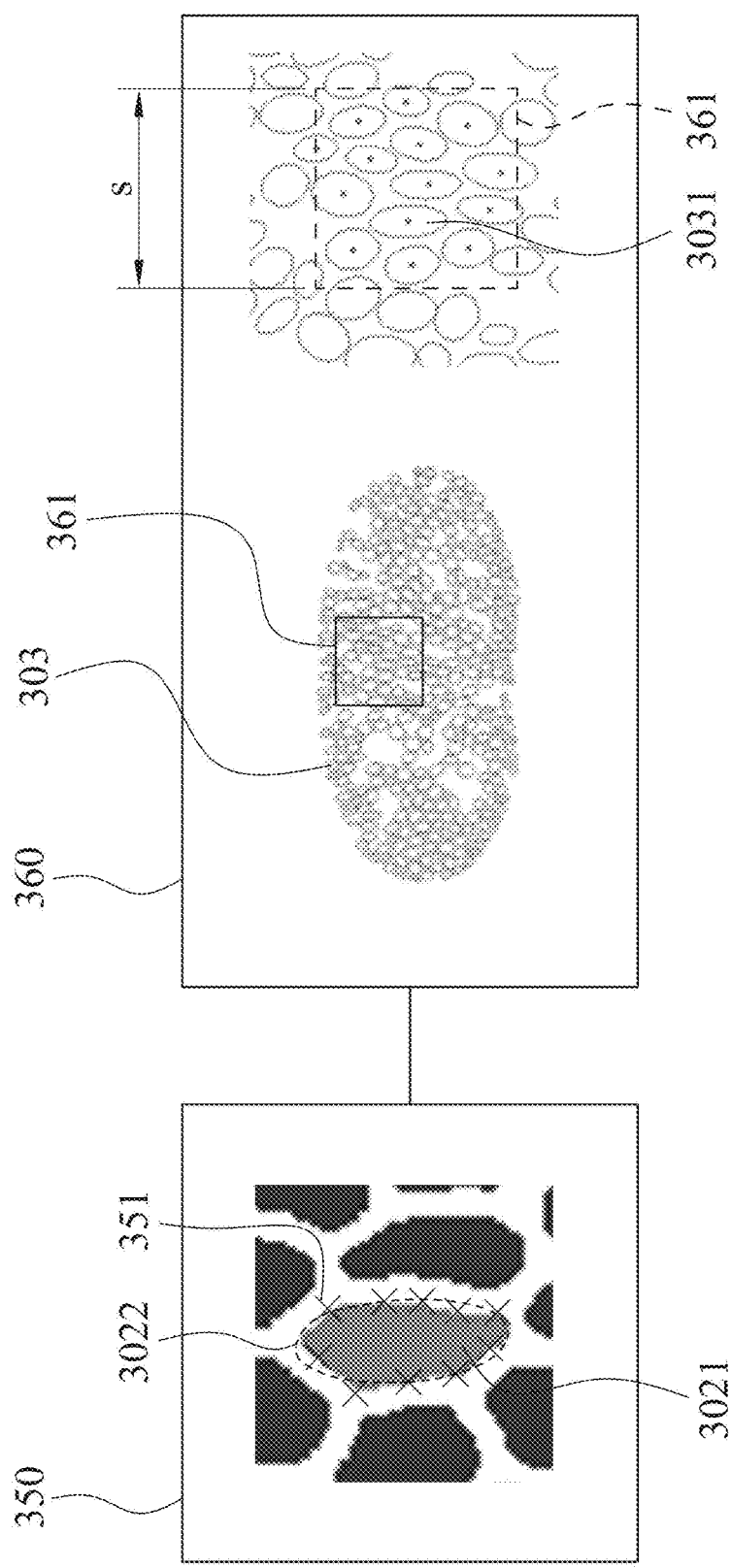
FIG. 6A is a processing diagram of a fitting step of the method for analyzing biological-tissue image of the present disclosure.
FIG. 6B is a processing diagram of a sampling step of the method for analyzing biological-tissue image of the present disclosure.
Figure 7:
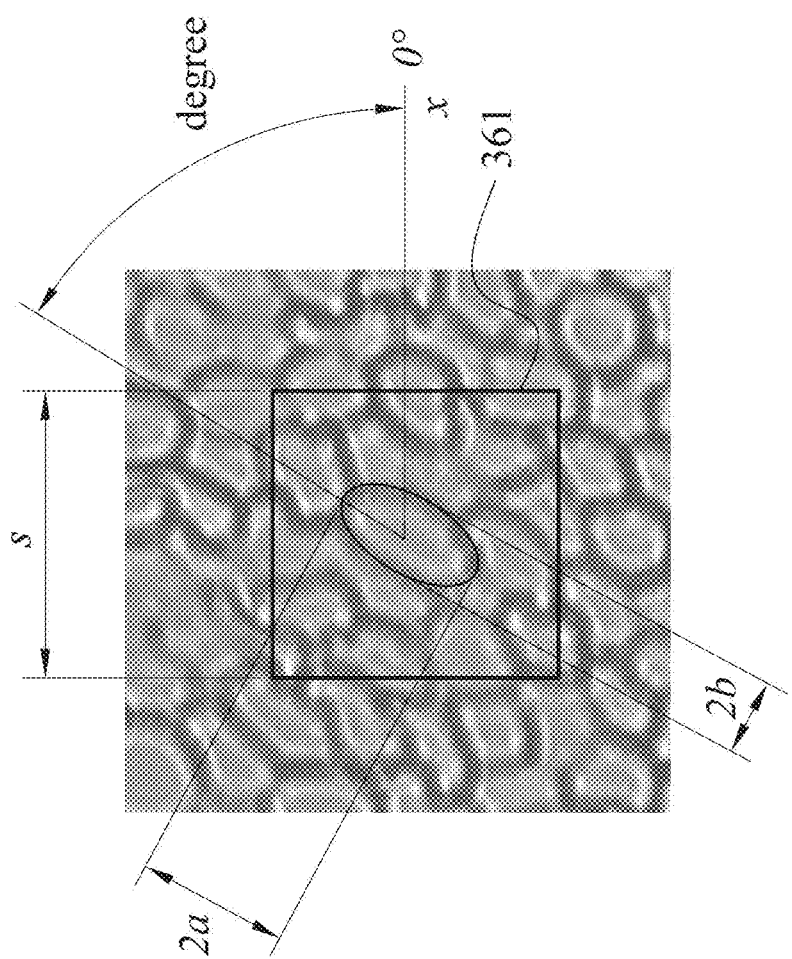
FIG. 7 shows a length vector parameter, a width vector parameter, and a pointing angle parameter of the method for analyzing biological-tissue image of the present disclosure.

Please refer to FIG. 6A, FIG. 6B and FIG. 7 simultaneously, wherein FIG. 6A is a processing diagram of a fitting step 350 of the method for analyzing biological-tissue image of the present disclosure, FIG. 6B is a processing diagram of a sampling step 360 of the method for analyzing biological-tissue image of the present disclosure, and FIG. 7 shows a length vector parameter, a width vector parameter, and a pointing angle parameter of the method for analyzing biological-tissue image of the present disclosure.

After finishing the processes of the image pre-processing step 300, as shown in FIG. 6A, a geometric shape 3022 of a target object image blocks 3021 of the enhanced image 302 for object fitting will be processed by the fitting step 350 by a fitting module. In the fitting step 350, at least 3 sampled edge pixels 351 sampled from the contour of the target object image block 3021 will be used to fit into the geometric shape 3022 so as to parameterize the target object image blocks 3021 and then obtain a processed biological-tissue image 303 (marked in FIG. 6B) including a plurality of object fitting images, wherein each of the object fitting images 3031 includes a length vector parameter, a width vector parameter, and a pointing angle parameter. More preferably, 5 to 50 sampled edge pixels 351 sampled from the contour of the target object image block 3021 will be used to fit into the geometric shape 3022 in the fitting step 350.

As shown in FIG. 6B, in the sampling step 360, a target region 361 of the processed biological-tissue image 303 will be selected by a sampling module, wherein a shape of the target region 361 is a square shape and the target region 361 includes at least 5 object fitting images 3031 so as to increase the accuracy of the following methods for analyzing biological-tissue image.

Furthermore, as shown in FIG. 6B and FIG. 7, a geometric shape of each of the object fitting images 3031 is an ellipse shape. A value of the length vector parameter is two times of a length of a semi-major axis a of the ellipse shape, and a value of the width vector parameter is two times of a length of a semi-minor axis b of the ellipse shape. A length of one side s of the target region 361 is equal to 2 to 10 times of an averaged length of the semi-major axis a of the object fitting images 3031. Moreover, it must be noted that the biological-tissue image of FIG. 7 is different from the biological-tissue image 301 of the target feather rachis tissue of bird and is only used for illustrate the measuring positions of the length vector parameter, the width vector parameter, and the pointing angle parameter of the biological-tissue image of the present disclosure.

4. Calculating and Analyzing

Figure 8:
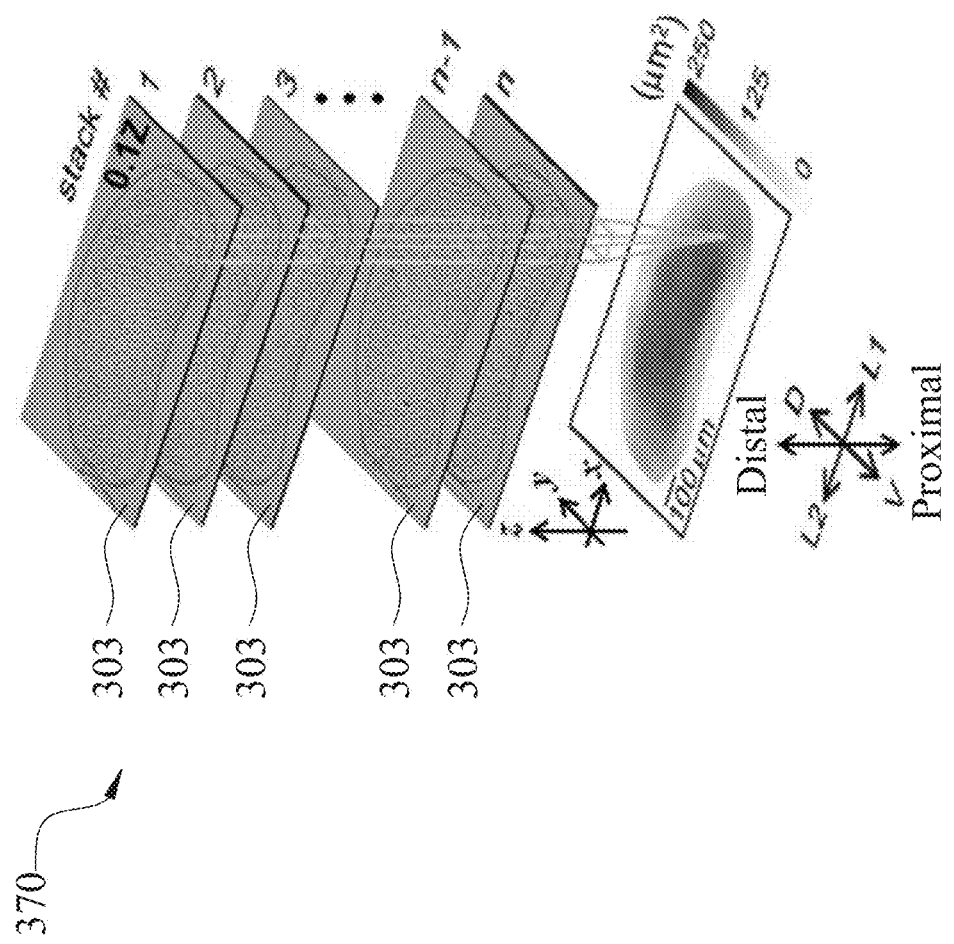
FIG. 8 is a processing diagram of a calculating and analyzing step of the method for analyzing biological-tissue image of the present disclosure.

Please refer to FIG. 6B and FIG. 8 simultaneously, wherein FIG. 8 is a processing diagram of a calculating and analyzing step 370 of the method for analyzing biological-tissue image of the present disclosure. In the calculating and analyzing step 370, the processed biological-tissue images 303 of the plurality of sections of a target tissue sample within a finite depth region will be overlapped by a calculating and analyzing module so as to coincide all of the target regions 361 of the processed biological-tissue images 303 of the plurality of sections of a target tissue sample within a finite depth region thereof. A regional averaged object size PS or a regional averaged elongation rate PEL of all of the object fitting images 3031 are respectively calculated based on the length vector parameters and the width vector parameters of the object fitting images 3031 within the target regions 361, and a regional averaged pointing angle of objects is calculated based on the pointing angle parameters of all of the object fitting images 3031 within the target regions 361. An analysis result of a target regional center of the biological-tissue image is output based on the regional averaged object size, the regional averaged elongation rate, or the regional averaged pointing angle of objects by a coarse-graining method.

II. Assessing the Analyzing Efficiency of the Method for Analyzing Biological-Tissue Image and the System for Analyzing Biological-Tissue Image of the Present Disclosure 1. Analyzing the Feather Rachis Tissue of Bird with Computed Tomography Images Please refer to FIG. 9, which shows computed tomography images of a feather rachis tissue of chicken primary feather analyzed in the method for analyzing biological-tissue image of the present disclosure. In FIG. 9, Feather rachis section image 1 and Feather rachis section image 2 are respectively computed tomography images of a feather rachis tissue in a midpoint of full length of chicken primary feather, wherein Magnified image 11, Magnified image 12 and Magnified image 13 respectively show magnified images of Region B1, Region B2 and Region B3 of Feather rachis section image 1, and Magnified image 21, Magnified image 22 and Magnified image 23 respectively show magnified images of Region B1, Region B2 and Region B3 of Feather rachis section image 2.

In Magnified image 11, Magnified image 12, Magnified image 13, Magnified image 21, Magnified image 22 and Magnified image 23, the porous tissues thereof are composed of keratinocytes over different regions of the medulla in the feather rachis tissue, so that the keratinocytes distribution of the medulla in the feather rachis tissue will be further analyzed by the method for analyzing biological-tissue image and the system for analyzing biological-tissue image of the present disclosure.

Furthermore, more than 20 optical sections of the computed tomography images of the feather rachis tissue are analyzed in the present example, and the aforementioned Feather rachis section image 1 and Feather rachis section image 2 are illustrated for representatives. Furthermore, it must be noted that the analyzed region in the present example includes all the portions of the medulla of the feather rachis tissue and is not restricted in the aforementioned Magnified image 11, Magnified image 12, Magnified image 13, Magnified image 21, Magnified image 22 and Magnified image 23.

Figure 10:
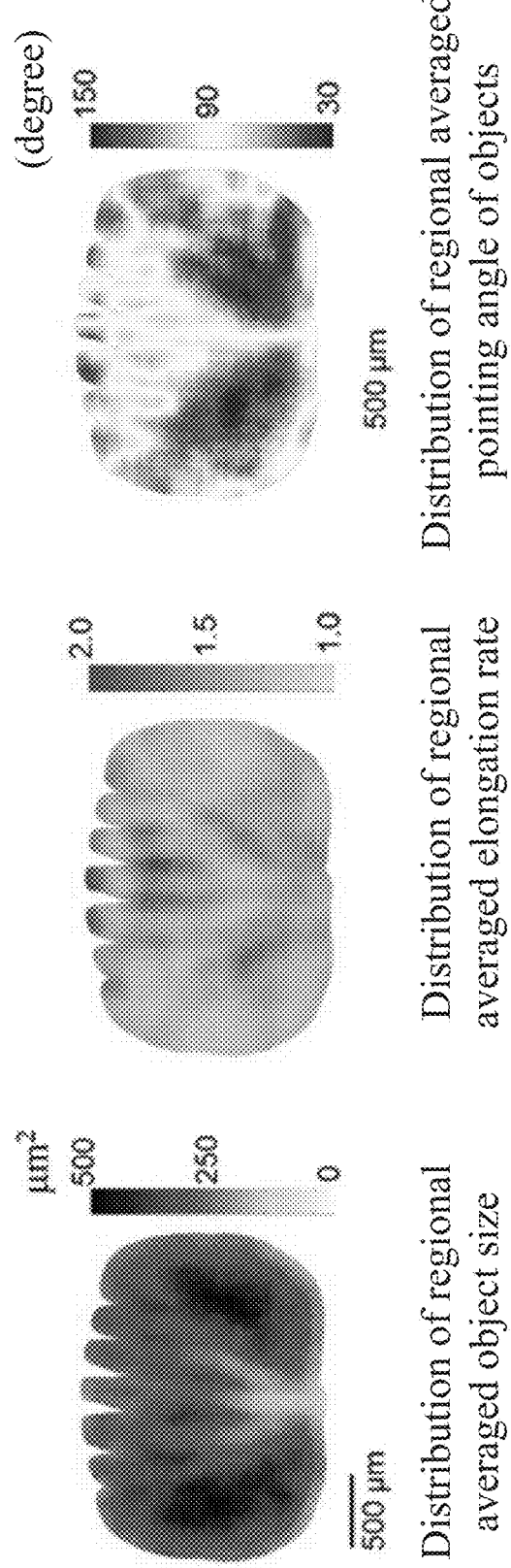
FIG. 10 shows results of quantified cellular morphology distributions of the feather rachis tissue of chicken primary feather of FIG. 9.

Please refer to FIG. 10, which shows results of quantified cellular morphology distributions of the feather rachis tissue of chicken primary feather of FIG. 9. As shown in FIG. 9, by overlapping 20 optical sections of computed tomography images of the feather rachis tissue in the midpoint of full length of chicken primary feather and respectively coinciding all of Regions B1, Regions B2 and Regions B3 of the computed tomography images, a distribution of regional averaged object size, a distribution of regional averaged elongation rate, and a distribution of regional averaged pointing angle of objects of the keratinocytes of the medulla in the feather rachis tissue can be respectively illustrated by heatmap diagrams, so as to intuitively present the analysis results of the quantified cellular morphology distributions in a specific region.

In detail, as shown in the result of the distribution of regional averaged object size of cells, the distribution pattern of the keratinocytes in the medulla of the feather rachis tissue is a mirror image distribution based on the center tangent of the medulla, and there are larger cells in the center on both sides of the medulla (those are, the dark portion thereof). As shown in the result of the distribution of regional averaged elongation rate of cells, a shape of the cell located on the side of the wrinkled region of the medulla is relatively long and narrow. As shown in the result of the distribution of regional averaged pointing angle of objects of cells, the distribution of pointing angle of cells are in opposite directions on each side of the medulla. The aforementioned results are consistent with the results examining by the optical microscopy of the feather rachis tissue.

2. Analyzing the Articular Cartilage Tissue of a Mouse Knee Joint with Optical Microscope Images Please refer to FIG. 11, which shows optical microscope images of articular cartilage tissue of mouse knee joint analyzed in the method for analyzing biological-tissue image of the present disclosure. The section image of articular cartilage tissue of FIG. 11 is obtained by staining the tissue section of the articular cartilage tissue of mouse knee joint with hematoxylin-eosin staining method and then photographed under a microscope, wherein Magnified image 3 is an magnified image of Region C1 of the section image of articular cartilage tissue, Magnified image 31, Magnified image 32 and Magnified image 33 are respectively magnified images of the superficial cartilage zone RZ, the middle cartilage zone PZ, and the deep cartilage zone HZ of Region C1, and the cellular morphology distribution of the section images of articular cartilage tissue of mouse knee joint will further analyzed by the method for analyzing biological-tissue image and the system for analyzing biological-tissue image of the present disclosure.

Furthermore, more than 6 optical microscope images of articular cartilage tissue are analyzed in the present example, and the section image of articular cartilage tissue of FIG. 11 is illustrated for representatives. Furthermore, it must be noted that the analyzed region in the present example includes all the portions of the section image of articular cartilage tissue and is not restricted in the aforementioned Magnified image 31, Magnified image 32 and Magnified image 33.

Please refer to FIG. 12, which shows results of quantified cellular morphology distributions of the articular cartilage tissue of the mouse knee joint of FIG. 11. As shown in FIG. 11, by overlapping 6 optical microscope images of articular cartilage tissue of mouse knee joint and respectively coinciding all of the images of the superficial cartilage zone RZ, the middle cartilage zone PZ and the deep cartilage zone HZ, a distribution of regional averaged object size, a distribution of regional averaged elongation rate, and a distribution of regional averaged pointing angle of objects of the cells in the articular cartilage tissue of mouse knee joint can be respectively illustrated by heatmap diagrams, and the aforementioned results are consistent with the results examining by the optical microscopy of the articular cartilage tissue.

3. Analyzing the Skin Tissue with Optical Microscope Images

In the present example, the optical microscope images with hematoxylin-eosin staining of the skin tissue section of the patient with ichthyosis are analyzed and further compared with the optical microscope images with hematoxylin-eosin staining of the skin tissue section of the normal person so as to assess the cell morphology and the distribution thereof of the skin of the patient with ichthyosis. Furthermore, more than 7 optical microscope images of the skin tissue section of the patient with ichthyosis and more than 5 optical microscope images of the skin tissue section of the normal person are respectively analyzed in the present example. It must be noted that the analyzed region in the present example includes all the portions of the optical microscope images of the skin tissue section, and the optical microscope images of the skin tissue section of FIG. 13 is illustrated for representatives.

Figure 13:
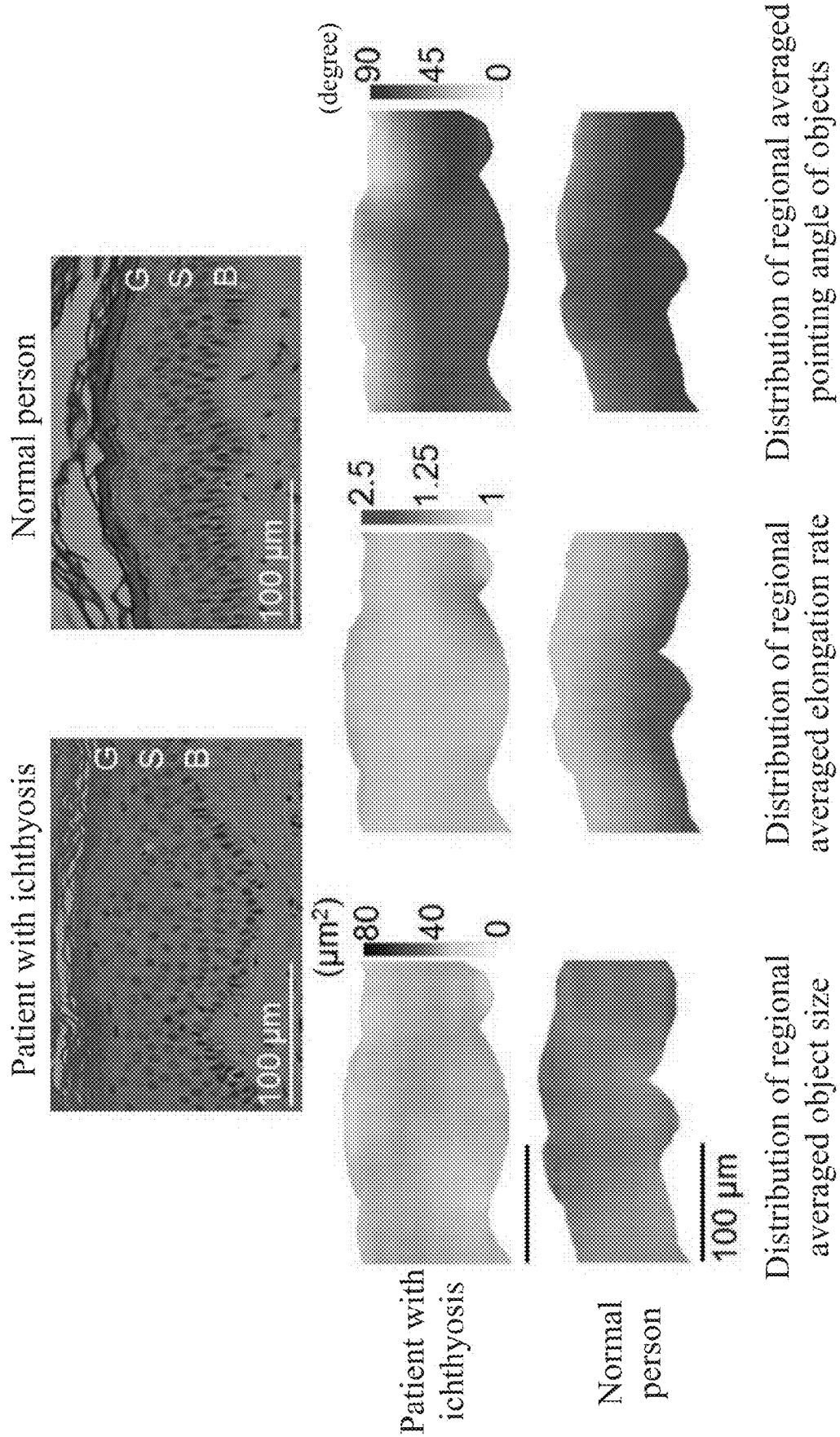
FIG. 13 shows results of quantified cellular morphology distributions of a skin tissue analyzed in the method for analyzing biological-tissue image of the present disclosure.

Please refer to FIG. 13, which shows results of quantified cellular morphology distributions of a skin tissue analyzed in the method for analyzing biological-tissue image of the present disclosure. As shown in the optical microscope images of FIG. 13, the epidermis of the patient with ichthyosis is thicker compared with that of the normal person, and the size of skin cells in the patient with ichthyosis is smaller than that of the normal person. Furthermore, as in the analyzed results of the method for analyzing biological-tissue image and the system for analyzing biological-tissue image of the present disclosure, it also shows that the size of skin cells of the patient with ichthyosis is smaller than that of the normal person, and there are differences in the shape of cells.

As shown in the aforementioned results, by analyzing the length vector parameter, the width vector parameter, and the pointing angle parameter of object fitting images of the specific target region of each of the biological-tissue images, and calculating the regional averaged object size, the regional averaged elongation rate, or the regional averaged pointing angle of objects of the three-dimensional space formed by the accumulation within the target regions of the processed biological-tissue images, the present disclosure can output an analysis result of a target regional center of the biological-tissue images weighted by sampling region. Thus, the morphological information which is implicit in the biological-tissue image can be quantified spatially, so that it is favorable for intuitively and precisely analyzing the microscopic morphological characteristics and the spatial distributions of these microscopic morphological characteristics within the target tissue sample, and it has application potentials in relevant fields.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A method for analyzing biological-tissue image, comprising:

providing a plurality of biological-tissue images, wherein the biological-tissue images are respectively corresponding to a set of micro-images of a plurality of sections of a target tissue sample within a finite depth region in the target tissue sample, and each of the biological-tissue images comprises a plurality of target object image blocks;

performing an image pre-processing step, wherein an image feature of each of the biological-tissue images is adjusted so as to obtain a plurality of processed biological-tissue images;

performing a fitting step, wherein a contour of each of the target object image blocks within each of the processed biological-tissue images is identified by an edge-finding method so as to obtain a plurality of object fitting images of the target object image blocks by fitting randomly sampled edge pixels of each of the target object image blocks into a geometric shape, wherein a number of the sampled edge pixels for fitting the geometric shape is at least 3, and each of the object fitting images comprises a length vector parameter, a width vector parameter, and a pointing angle parameter;

performing a sampling step, wherein the length vector parameter, the width vector parameter, and the pointing angle parameter of each of the object fitting images within a target region of each of the processed biological-tissue images are extracted, and each of the target regions comprises the object fitting images, wherein the sampling step comprises the processed biological-tissue images, a shape and a size of the target region of one of the processed biological-tissue images are identical to those of another one of the processed biological-tissue images, and a horizontal coordinate position of the target region of one of the processed biological-tissue images is coincided to that of another one of the processed biological-tissue images; and performing a calculating and analyzing step, wherein the processed biological-tissue images are overlapped so as to coincide the target regions thereof, a regional averaged object size and a regional averaged elongation rate within the object fitting images are respectively calculated based on the length vector parameters and the width vector parameters of the object fitting images within the target regions, and a regional averaged pointing angle of objects is calculated based on the pointing angle parameters of the object fitting images within the target regions;

wherein an analysis result of a target regional center of the biological-tissue images is output based on the regional averaged object size, the regional averaged elongation rate, or the regional averaged pointing angle of objects in the calculating and analyzing step.

2. The method of claim 1, wherein the image feature of each of the biological-tissue images comprises a contrast value and a grayscale value, the contrast value of each of the biological-tissue images is adjusted according to a contrast limited adaptive histogram equalization (CLAHE) enhancement method in the image pre-processing step, and the grayscale value of each of the biological-tissue images is adjusted according to a binarization processing method in the image pre-processing step.

3. The method of claim 2, further comprising:

processing an image enhancing step, wherein each of the biological-tissue images is processed by a noise removing method and a morphological closing method so as to obtain a plurality of enhanced images for object fitting, and the enhanced images for object fitting are processed in the fitting step so as to obtain the object fitting images.

4. The method of claim 1, wherein the number of the sampled edge pixels for fitting the geometric shape is 5 to 50, and each of the target regions comprises at least 5 of the object fitting images.

5. The method of claim 1, wherein a geometric shape of each of the object fitting images is an ellipse shape, a value of the length vector parameter is two times of a length of a semi-major axis of the ellipse shape, and a value of the width vector parameter is two times of a length of a semi-minor axis of the ellipse shape.

6. The method of claim 5, wherein a shape of each of the target regions is a square shape, and a length of one side of the square shape is equal to 2 to 10 times of an averaged length of the semi-major axis of the object fitting images.

7. The method of claim 5, wherein:

in each of the object fitting images, the length of a semi-major axis is a, the length of a semi-minor axis is b, a size of the object fitting image is $\pi ab$, and an elongation rate of the object fitting image is b/a, wherein $\pi$ is a circular constant; and in the object fitting images within the target region of each of the processed biological-tissue images, the regional averaged object size is PS, the regional averaged elongation rate is PEL, and the following conditions are satisfied:

$PS=\Sigma(\pi ab)/n$; and $PEL=\Sigma(b/a)/n$;

wherein n is a number of the object fitting images within the target region.

8. The method of claim 1, wherein each of the biological-tissue images is a computed tomography image, an optical microscope image, or an electron microscope image.

9. The method of claim 1, further comprising:

performing an analysis result output step, wherein the analysis result of the target regional center of the biological-tissue images is output by a coarse-graining method based on the regional averaged object size, the regional averaged elongation rate, or the regional averaged pointing angle of objects of the object fitting images.

10. The method of claim 1, wherein a thickness of each of the sections of the target tissue sample is 0.5 to 10 μm, and a number of the biological-tissue images is at least 5.

11. A system for analyzing biological-tissue image, comprising:

an image capturing device for capturing a plurality of biological-tissue images, wherein the biological-tissue images are respectively corresponding to a set of micro-images of a plurality of sections of a target tissue sample within a finite depth region in the target tissue sample, and each of the biological-tissue images comprises a plurality of target object image blocks; and a processor electronically connected to the image capturing device, wherein the processor comprises a biological-tissue image assessing program, and the biological-tissue image assessing program comprises:

an image pre-processing module for adjusting an image feature of each of the biological-tissue images so as to obtain a plurality of processed biological-tissue images;

a fitting module for identifying a contour of each of the target object image blocks within each of the processed biological-tissue images by an edge-finding method so as to obtain a plurality of object fitting images of the target object image blocks by fitting randomly sampled edge pixels of each of the target object image blocks into a geometric shape, wherein a number of the sampled edge pixels for fitting the geometric shape is at least 3, and each of the object fitting images comprises a length vector parameter, a width vector parameter, and a pointing angle parameter;

a sampling module for extracting the length vector parameter, the width vector parameter, and the pointing angle parameter of the object fitting images of each of the object fitting images within a target region of each of the processed biological-tissue images, and each of the target regions comprising the object fitting images, wherein the sampling module comprises the processed biological-tissue images, a shape and a size of the target region of one of the processed biological-tissue images are identical to those of another one of the processed biological-tissue images, and a horizontal coordinate position of the target region of one of the processed biological-tissue images is coincided to that of another one of the processed biological-tissue images; and a calculating and analyzing module for calculating and analyzing a quantitative morphological feature obtained from the biological tissue images, wherein by overlapping the processed biological-tissue images so as to coincide the target regions thereof, a regional averaged object size, or a regional averaged elongation rate of the object fitting images are respectively calculated based on the length vector parameters and the width vector parameters of the object fitting images within the target regions, and a regional averaged pointing angle of objects is calculated based on the pointing angle parameters of the object fitting images within the target regions;

wherein an analysis result of a target regional center of the biological-tissue images is output based on the regional averaged object size, the regional averaged elongation rate, or the regional averaged pointing angle of objects by the calculating and analyzing module.

12. The system of claim 11, wherein the image feature of each of the biological-tissue images comprises a contrast value and a grayscale value, the contrast value of each of the biological-tissue images is adjusted according to a contrast limited adaptive histogram equalization enhancement method by the image pre-processing module, and the grayscale value of each of the biological-tissue images is adjusted according to a binarization processing method by the image pre-processing module.

13. The system of claim 12, further comprising:
an image enhancing module for processing each of the biological-tissue images by a noise removing method and a morphological closing method so as to obtain a plurality of enhanced images for object fitting, and the enhanced images for object fitting are processed by the fitting module so as to obtain the object fitting images.

14. The system of claim 11, wherein the number of the sampled edge pixels is 5 to 50, and each of the target regions comprises at least 5 of the object fitting images.

15. The system of claim 11, wherein a geometric shape of each of the object fitting images is an ellipse shape, a value of the length vector parameter is two times of a length of a semi-major axis of the ellipse shape, and a value of the width vector parameter is two times of a length of a semi-minor axis of the ellipse shape.

16. The system of claim 15, wherein a shape of each of the target regions is a square shape, and a length of one side of the square shape is equal to 2 to 10 times of an averaged length of the semi-major axis of the object fitting images.

17. The system of claim 15, wherein:
in each of the object fitting images, the length of a semi-major axis is a, the length of a semi-minor axis is b, a size of the object fitting image is $\pi ab$, and an elongation rate of the object fitting image is b/a, wherein $\pi$ is a circular constant; and in the object fitting images within the target region of each of the processed biological-tissue images, the regional averaged object size is PS, the regional averaged elongation rate is PEL, and the following conditions are satisfied:

$PS=\Sigma(\pi ab)/n$; and $PEL=\Sigma(b/a)/n$;

wherein n is a number of the object fitting images within the target region.

18. The system of claim 11, wherein each of the biological-tissue images is a computed tomography image, an optical microscope image, or an electron microscope image.

19. The system of claim 11, further comprising:
an analysis result output module, wherein the analysis result of the target regional center of the biological-tissue images is output by a coarse-graining method based on the regional averaged object size, the regional averaged elongation rate, or the regional averaged pointing angle of objects of the object fitting images.

20. The system of claim 11, wherein a thickness of each of the sections of the target tissue sample is 0.5 to 10 μm, and a number of the biological-tissue images is at least 5.

* * * * *